US008073683B2

(12) United States Patent
Alshawi et al.

(10) Patent No.: US 8,073,683 B2
(45) Date of Patent: *Dec. 6, 2011

(54) LANGUAGE-UNDERSTANDING TRAINING DATABASE ACTION PAIR AUGMENTATION USING BIDIRECTIONAL TRANSLATION

(75) Inventors: Hiyan Alshawi, Madison, NJ (US); Shona Douglas, Madison, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/336,429

(22) Filed: Dec. 16, 2008

(65) Prior Publication Data

US 2009/0099837 A1   Apr. 16, 2009

Related U.S. Application Data

(63) Continuation of application No. 11/656,155, filed on Jan. 22, 2007, now Pat. No. 7,467,081, which is a continuation of application No. 10/103,049, filed on Mar. 22, 2002, now Pat. No. 7,212,964, which is a continuation-in-part of application No. 09/732,600, filed on Dec. 8, 2000, now abandoned.

(51) Int. Cl.
*G06F 17/21* (2006.01)
*G06F 17/26* (2006.01)

(52) U.S. Cl. ............... 704/10; 704/2; 704/7; 704/9

(58) Field of Classification Search ............... None
See application file for complete search history.

(56) References Cited

U.S. PATENT DOCUMENTS

| | | | |
|---|---|---|---|
| 5,530,861 A | 6/1996 | Diamant et al. | |
| 5,675,707 A | 10/1997 | Gorin et al. | |
| 5,729,659 A | 3/1998 | Potter | |
| 5,826,219 A | 10/1998 | Kutsumi | |
| 5,907,821 A | 5/1999 | Kaji et al. | |
| 6,122,614 A | 9/2000 | Kahn et al. | |
| 6,138,100 A | 10/2000 | Dutton et al. | |
| 6,178,404 B1 | 1/2001 | Hambleton et al. | |
| 6,275,789 B1 | 8/2001 | Moser et al. | |
| 6,292,779 B1 | 9/2001 | Wilson et al. | |
| 6,311,159 B1 | 10/2001 | Van Tichelen et al. | |
| 6,324,512 B1 | 11/2001 | Junqua et al. | |

(Continued)

FOREIGN PATENT DOCUMENTS

JP     11259089      9/1999

(Continued)

OTHER PUBLICATIONS

Nagy D., et al: "Automated Language Acquisition in Multimodal Environment" 2000 IEEE Int'l Conf. on Multimedia and Expo. ICME2000. Proceedings. Latest Advances in the Fast Changing World of Multimedia, IEEE Piscataway, NJ, USA, vol. 2, Jul. 30, 2000, pp. 937-940.

(Continued)

*Primary Examiner* — Talivaldis Ivars Smits

(57) ABSTRACT

Embodiments of the present invention relate to a method and system for augmenting a training database of an automated language-understanding system. In one embodiment, a training example in a first language is received from the training database. The first language-training example is translated to a second language output. The second language output is translated to a first variant of the first language-training example. An action pair including the first variant of the first language-training example and an action command associated with the first language-training example is stored in an augmented training database.

18 Claims, 3 Drawing Sheets

U.S. PATENT DOCUMENTS

| | | | |
|---|---|---|---|
| 6,327,566 | B1 | 12/2001 | Vanbuskirk et al. |
| 6,341,372 | B1 | 1/2002 | Datig |
| 6,345,243 | B1 | 2/2002 | Clark |
| 6,453,292 | B2 | 9/2002 | Ramaswamy et al. |
| 6,658,388 | B1 | 12/2003 | Kleindienst et al. |
| 6,684,183 | B1 | 1/2004 | Korall et al. |
| 6,782,356 | B1 | 8/2004 | Lopke |
| 7,212,964 | B1 | 5/2007 | Alshawi et al. |
| 7,467,081 | B2 | 12/2008 | Alshawi et al. |
| 2001/0042087 | A1 | 11/2001 | Kephart et al. |
| 2002/0107838 | A1 | 8/2002 | Tsai |
| 2002/0164000 | A1 | 11/2002 | Cohen et al. |

FOREIGN PATENT DOCUMENTS

| | | |
|---|---|---|
| JP | 2000259628 | 9/2000 |
| WO | WO 94/16437 | 7/1994 |

OTHER PUBLICATIONS

Arai, K., et al: "Grammar Fragment Acquisition Using Syntactic and Semantic Clustering", Speech Communication Elsevier Netherlands, vol. 27, No. 1, 1999, pp. 43-62.

Gorin, A.: "On Automated Language Acquisition", Journal of the Acoustical Society of America, American Institute of Physics, NY, US, vol. 97, No. 6, Jun. 1995, pp. 3441-3461.

McNair, A.E., et al: "Improving Recognizer Acceptance Through Robust, Natural Speech Repair"., ICSLP 94 : 1994 International Conference on Spoken Language Processing. Yokohama, Japan, Sep. 18-22, 1994, vol. 3, pp. 1299-1302.

Scott Miller, David Stallard, Robert Bobrow, and Richard Schwartz, A Fully Statistical Approach to Natural Language Interfaces, BBN Systems and Technology.

Roberto Pieraccini, Esther Levin and Enrique Vidal, Learning How to Understand Language, Proceedings of EUROSPEECH-93.

J. H. Wright, A. L. Gorin and G. Riccardi, Automatic Acquisition of Salient Grammar Fragments for Call-Type Classification, Proceeding of EUROSPEECH-97.

PTO-892 attached to Office Action dated Nov. 4, 2004 of then copending U.S. Appl. No. 09/732,600, filed Dec. 8, 2000, now abandoned.

EPO Search Report dated Mar. 1, 2005, of correcsponding European Patent application No. EP 01 31 0087, 3 pages.

Examination Report from EP 01 310 087.0, Feb. 23, 2010, 3 pages.

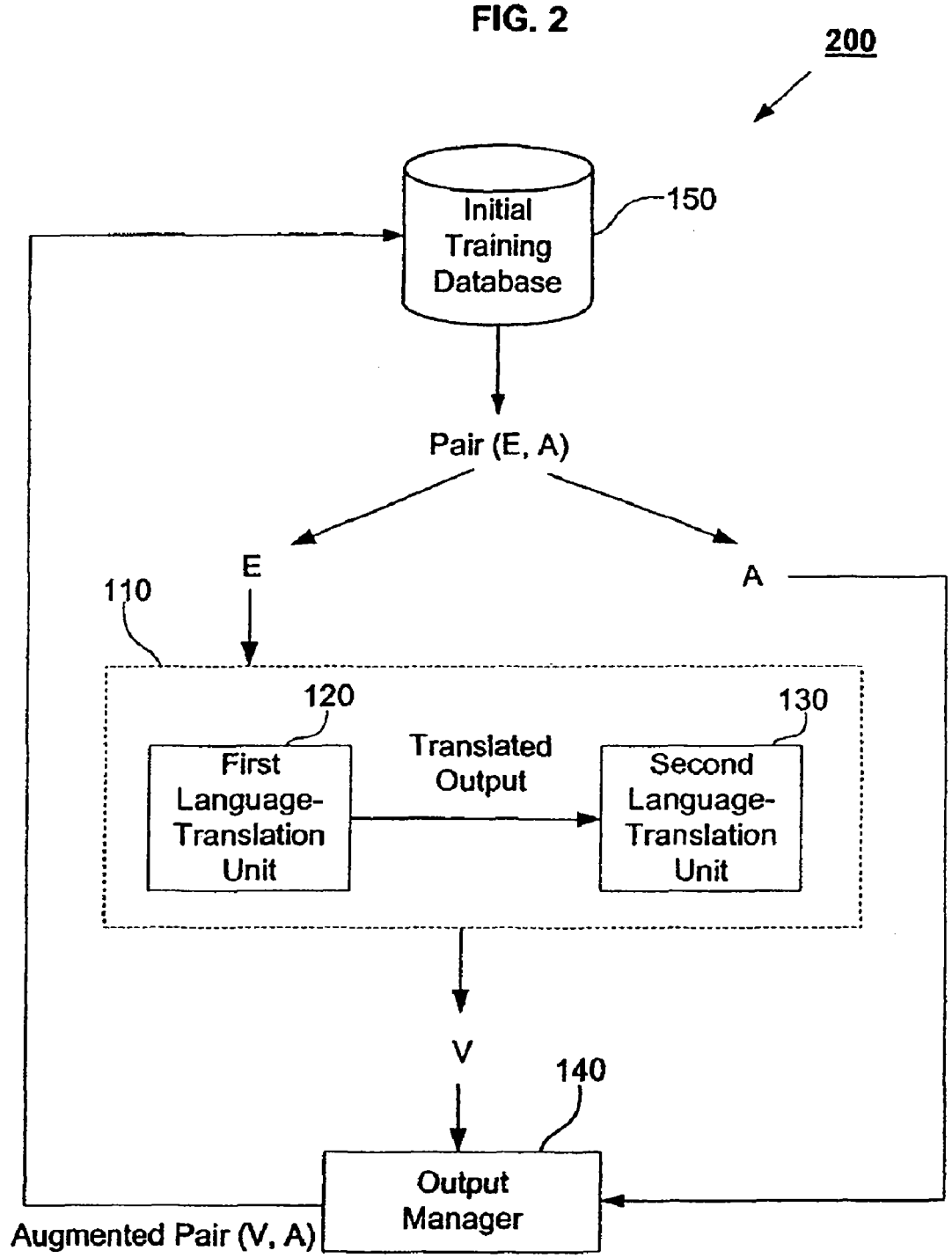

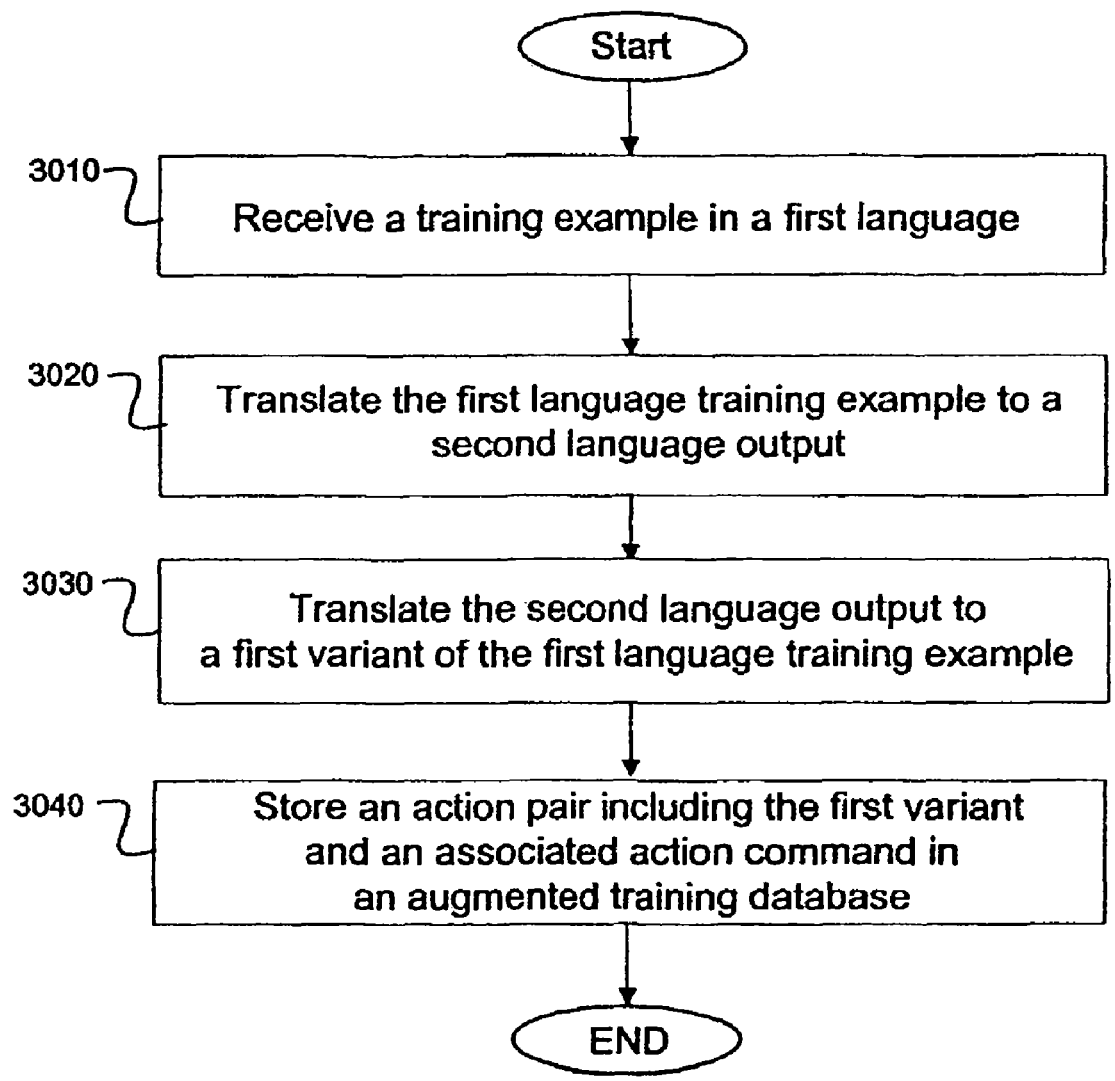

LANGUAGE-UNDERSTANDING TRAINING DATABASE ACTION PAIR AUGMENTATION USING BIDIRECTIONAL TRANSLATION

RELATED APPLICATION

This application is a continuation of U.S. patent application Ser. No. 11/656,155 filed Jan. 22, 2007 (now U.S. Pat. No. 7,467,081) which is a continuation of U.S. patent application Ser. No. 10/103,049, filed Mar. 22, 2002, (now U.S. Pat. No. 7,212,964), which is a continuation-in-part of U.S. patent application Ser. No. 09/732,600, filed Dec. 8, 2000, now abandoned, which are all incorporated herein by reference in their entirety.

TECHNICAL FIELD

This invention relates generally to automated language-understanding systems. More particularly, the invention relates to automatically generating training examples used by automated language-understanding systems.

BACKGROUND OF THE INVENTION

In recent years, the desire to use automated language-understanding systems has increased. Automated language-understanding systems have been applied to a variety of interactive services to automate the service and/or reduce costs. Services benefiting from an automated language-understanding interface may include, for example, services providing products and/or services, e-mail services, and telephone banking and/or brokerage services, etc.

Automated language-understanding systems permit users to input a request relating to a desired action. Users may enter, for example, speech, typed and/or written inputs into the system. The understanding system recognizes the command and performs the desired action.

SUMMARY OF THE INVENTION

Embodiments of the present invention relate to a method and system for augmenting a training database of an automated language-understanding system. In one embodiment, a training example in a first language may be received from the training database. The first language-training example may be translated to a second language output. The second language output may be translated to a first variant of the first language-training example. An action pair including the first variant of the first language-training example and an action command associated with the first language-training example may be stored in an augmented training database.

BRIEF DESCRIPTION OF THE DRAWINGS

Embodiments of the present invention are illustrated by way of example, and not limitation, in the accompanying figures in which like references denote similar elements, and in which:

FIG. 2 is a diagram of a system for augmenting a training database of an automated language-understanding application in accordance with another embodiment of the present invention; and FIG. 3 is a flowchart illustrating a method for augmenting a training database of an automated language-understanding system in accordance with an exemplary embodiment of the present invention.

DETAILED DESCRIPTION

Figure 1:
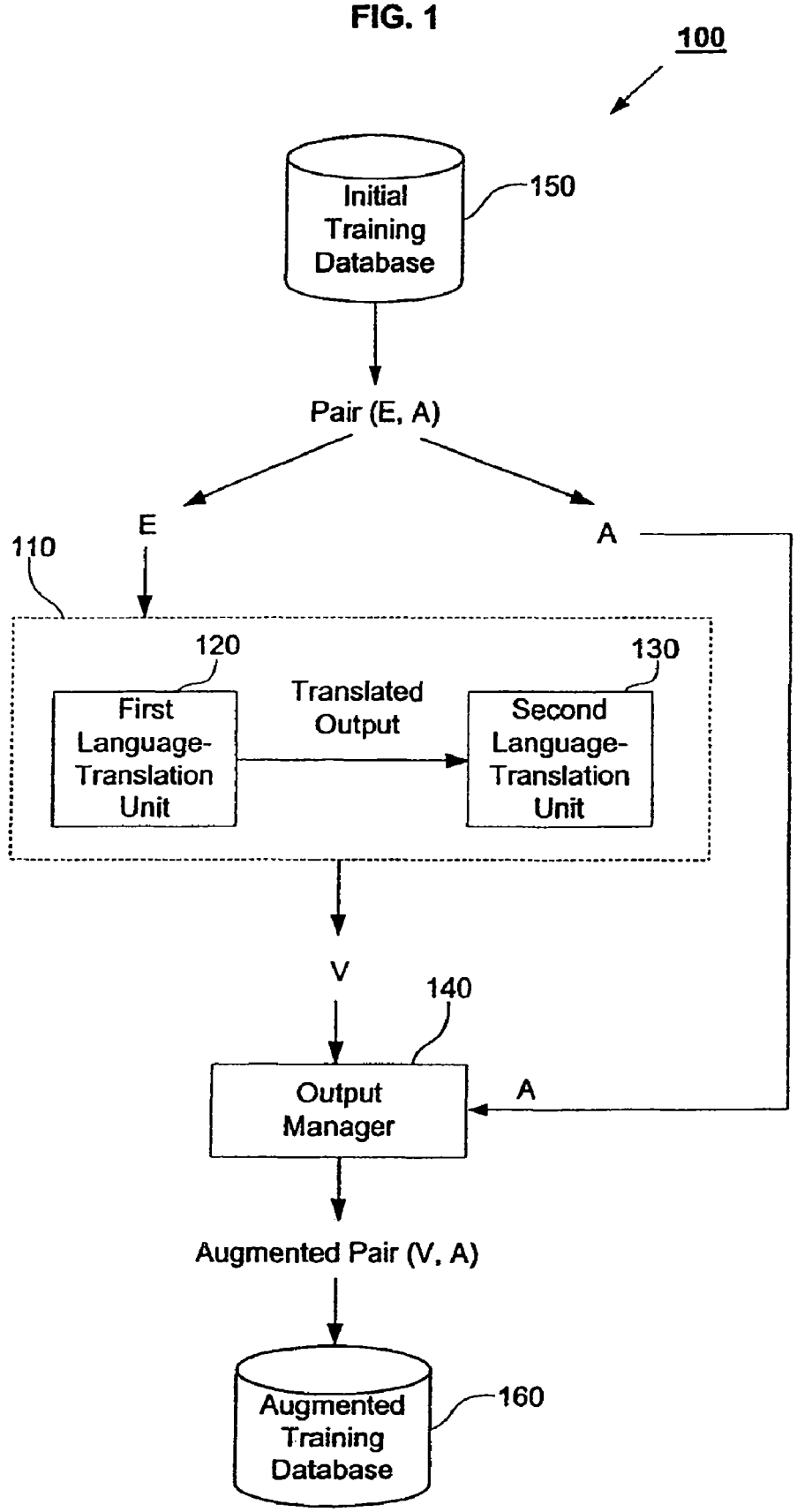
FIG. 1 is a diagram of a system for augmenting a training database of an automated language-understanding application in accordance with an embodiment of the present invention.

Embodiments of the present invention relate to systems and methods for automatically expanding a training database used in automated language-understanding systems. Embodiments of the invention may improve the accuracy and/or effectiveness of automated language-understanding systems using machine translation systems to automatically expand the training database.

Language understanding systems, in accordance with embodiments of the present invention, may utilize a training database that includes a mapping between anticipated inputs and corresponding representation of an action to be performed. The action may be a command that is executable by a computer. These training databases may be used in real time and/or may be used in advance to train the underlying application and/or service such as a speech-enabled e-mail service that uses the automated language-understanding system.

One application that may use an automated language-understanding system is a speech-enabled e-mail service. In this example, speech recognition technology is used to convert an input of human speech into a digitized representation. In the example described above, the understanding system converts the digitized representation into a computer executable action using various means including rules or by matching against contents of the training database. The system then executes the converted computer-executable action.

The accuracy and/or efficiency of automated language-understanding systems usually depend on the size and/or contents of the training database. Constructing the training database can be expensive both in terms of time and effort. An application developer typically anticipates, for example, phrases that a user may use to request a particular action and/or transaction. The developer also provides rules and/or data representative of the mapping between the anticipated phrases and the associated computer-executable action. This process can be very labor intensive and expensive especially in a system that permits automatic execution of many user requests. To minimize this expense, a relatively small database is beneficial. However, a small database may not include the numerous ways a user may request the required action. This may reduce the effectiveness and the ultimate use of the automated system.

FIG. 1 is an exemplary block diagram illustrating the use of a language variations generator 110 in accordance with an embodiment of the invention. FIG. 1 illustrates the expansion of the contents of the initial training database 150 into augmented training database 160. In an embodiment of the present invention, the language variations generator 110 may receive the contents of database 150 to generate variations its contents. The generated variations may then be stored in the augmented database 160 via output manager 140.

In an embodiment of the present invention, the initial training database 150 may include a plurality of entries and corresponding actions associated with those entries. The entries may be, for example, words, phrases, sentences, etc. related to inputs that may be expected from a user. The entries may be related to the underlying service utilizing the automated language-understanding system (not shown). The underlying services may include, for example, services providing products and/or services, e-mail services, telephone banking, brokerage services, etc. Therefore, if the underlying service using the automated language-understanding system is an e-mail service, then the entries in the training database 150 will typically be related to the operation of this service.

Entries included in the training database 150 may be, for example, "open unread messages" or "delete all messages that have been read." The initial training database 150 may further include computer executable commands associated with these entries. Of course, it is recognized that these entries are given by way of example only and that the training database may include other entries and corresponding commands that are related to other products, service, etc.

Embodiments of the present can find application in other types of systems, devices, etc. having automated language-understanding capabilities. For example, personal computers, personal digital assistants (PDAs), or other hardware devices that provide, for example, a speech recognition interface can benefit from embodiments of the present invention. Additionally, embodiments of the present invention may be implemented in existing software to provide automated language-understanding capabilities to existing devices and/or systems.

In embodiments of the present invention, an action pair Pair (E, A) including entry E and a corresponding action command A may be retrieved from initial training database 150, as shown in FIG. 1. The entry E may be a phrase or sentence representative of an anticipated request and the action A may be a computer-executable command associated with the entry E.

In an embodiment of the invention, the entry E may be input into the language variations generator (LVG) 110. In embodiments of the present invention, the LVG 110 may include one or more translation units 120 and 130. The first language-translation unit 120 and second language-translation unit 130 may be any known machine translation devices that use, for example, computer software and/or hardware to translate text from one natural language to another. These units or devices may be implemented using any hardware, software and/or any combination thereof. As is commonly known, the process of language translation involves the grammatical structure of each language and uses rules and assumptions to transfer the grammatical structure of the source language (text to be translated) into the target language (translated text). Companies that provide language products include, for example, ScanSoft, Inc. of Peabody, Mass. (http://www.lhsl.com/powertranslator), Trident Software, Inc. of Ukraine (http://www.trident.com), and SYSTRAN Software, Inc. of San Diego, Calif. (http://www.systransoft.com).

In embodiments of the present invention, the LVG 110 may include one or more language translation units. In one example, the first language-translation unit 120 may translate the entry E from the source language to the target language. The translated output may be, for example, input into the second language-translation unit 130 which may translate the target language back to the source language. In other words, one of the translation units may be a forward translation unit that translates an original input into another language and the other unit may be a reverse translation unit that translates the translated input back to the original language. The result may be a new phrase or sentence which, depending on the accuracy of the translation units used, is intended to preserve the meaning of the original phrase or sentence. Thus, the LVG 110 generates a variant V of entry E. The variant V may be a variation or another way of expressing the phrase or sentence represented by the original entry E. Accordingly, embodiments of the present invention may automatically generate variations of the plurality of entries of anticipated user inputs included in the initial training database 150.

Although embodiments of the present invention have been described with respect to machine translation systems, it is recognized that human translators can be utilized to perform, for example, the forward and backward translations in accordance with embodiments of the present invention.

In embodiments of the present invention, each entry E input to the LVG 110 may be translated to another natural language, for example, from English to German by the first language-translation unit 120. The output of the first language-translation unit 120 may then be input to the second language-translation unit 120. The second language-translation unit 130 may then translate the translated output back to the original natural language. For example, the second language-translation unit 130 may translate the output from German back to English. It is recognized that the target and source languages may be, for example, English, German, Italian, Portuguese, Japanese, Korean, Chinese, Russian, Hindi, or any other language.

In embodiments of the present invention, the variant V generated by the LVG 110 may differ from the original entry E in terms of vocabulary used, semantics, syntactic construction, punctuation, formatting, and the like. Accordingly, the use of language models, meaning preservation, etc. embodied in the translation system can be exploited to automatically augment the data used to train automated language-understanding systems. In accordance with embodiments of the present invention, multiple versions of the entries in the training database may be obtained by using forward and reverse translation for multiple language pairs.

In embodiments of the present invention, a variety of translation units provided by the same or different vendors may be included in the LVG 110. In an alternative embodiment of the present invention, the LVG 110 may employ more than two language-translation units that can be chained in longer sequences to produce further variation in the original language. In some case, intermediate translations may be produced between the forward and reverse translations described herein. For example, English to Spanish, Spanish to German, German to French, and French back to English language translation units may be employed in embodiments of the present invention to produce variations of the original input.

In embodiments of the present invention, a plurality of different variations of the original input may be generated by the LVG 110 that employs different numbers and/or language combinations of translation units. For example, the LVG 110 may employ two language-translation units to produce a first variation of the original input. Subsequently, the LVG 110 may employ three language-translation units to produce a second variation of the original input. Additionally, the LVG 110 may employ four or more language-translation units to produce yet another variation of the original input. Although multiple language-translation devices are described herein, it is recognized that a single language-translation device that translates inputs from a first language to a second language and then back to the first, for example, may be employed in accordance with embodiments of the present invention.

In alternative embodiments of the present invention, the LVG 110 may employ a single language device that generates a variation of the input. For example, a device that paraphrases an English input to create a variation of the original input may be used. Additionally or optionally, a device that uses, for example, a thesaurus or the like to generate a variation of the input may be used in embodiments of the present invention.

In embodiments of the present invention, the variations generated by the LVG 110 may be used directly by a system employing an automated language-understanding device. Alternatively and/or additionally, the generated variations may be stored in the augmented training database 160 for later use. For example, the contents of the augmented training database 160 may be used to train an automated language-understanding system.

In embodiments of the present invention, the augmented training database 160 may be common database that includes all the original entries and associated actions as the initial training database as well as all of the augmented entries and associated actions. Alternatively, the augmented training database 160 may be a separate database that includes only augmented entries and associated actions.

In embodiments of the present invention, the LVG 110 may output a variant V which may be, for example, a new phrase intended to preserve the meaning of the original entry E. The output manager 140 may pair the variant V with the action A originally associated with the entry E. The output manager 140 may forward the augmented pair (V, A) for storage in the augmented training database 160 and/or the output manager 110 may forward the augmented pair Pair (V,A) to a system employing an automated language-understanding interface. As indicated above, the action A may be, for example, a computer executable command or any other type of command for executing an action associated with augmented entry.

Embodiments of the present invention may be applicable in data driven systems such as automatically trainable system. In this case, the augmented training database 150 including the plurality of augmented pairs (V, A) may be used to train an automated understanding system. Alternatively, embodiments of the present invention may be applied in an automated language-understanding system in real time during operation. For example, a system that can handle multiple alternative inputs such as multiple recognition hypotheses from a speech recognizer may utilize the contents of the augmented database 160 as well as the initial database 150 as a user is utilizing the system. Accordingly, a non-trainable (e.g., rule based) language-understanding system that can handle multiple alternative inputs can benefit from embodiments of the present invention. In this case, the forward, intermediate and/or reverse translation components can be applied to produce variations or alternatives prior to handing the user's input to the underlying understanding system for processing. Accordingly, one or more of the variations generated may be in the scope covered by the understanding system even if the original input was not.

It is recognized that embodiments of the present invention can be used in an automated language-understanding system that receives a user's communication or inputs in the form of speech, text, digital signals, analog signals and/or any other forms of communications or communications signals. As used herein, user's communication can be a user's input in any form that represents, for example, a single word, multiple words, a single syllable, multiple syllables, a single phoneme and/or multiple phonemes. The user's communication may include a request for information, products, services and/or any other suitable requests.

A user's communication may be input via a communication device such as a wired or wireless phone, a pager, a personal digital assistant, a personal computer, a key board, key pad and/or any other device capable of sending and/or receiving communications. In embodiments of the present invention, the user's input could be in the form of a search request to search the World Wide Web (WWW), a Local Area Network (LAN), and/or any other private or public network for the desired information.

Embodiments of the present invention may be applied in a system that uses an automated speech recognizer (ASR). The ASR may operate similar to an interactive voice recognizer (IVR) that uses the augmented training database 160 generated by the LVG 110 in accordance with embodiments of the present invention. In embodiments of the present invention, the automated language-understanding system may use any known recognition techniques to recognize a user's input. In embodiments of the present invention, the underlying system may use the recognized communication to find a N-best match from the augmented entries of the augmented database 150 and/or the initial training database 150. Once a suitable match for the user's communication is found, the associated action command A may be executed to fulfill the user's request.

It is recognized that embodiments of the present invention can be applied in a system that uses a text recognizer, optical character recognizer and/or another type of recognizer or device that recognizes and/or processes a user's inputs, and/or a device that receives a user's input, for example, a keyboard or a keypad. Embodiments of the present invention may be incorporated within a personal computer, a telephone switch or telephone interface, and/or an Internet, Intranet and/or other type of server. It is further recognized that embodiments of the present invention may be used in conjunction with, for example, an Internet search engine that receives text, speech, etc. from an Internet user. In this case, the user's inputs may be received via an Internet connection and the automated language-understanding system may use embodiments of the invention as described herein.

FIG. 2 shows an exemplary alternative embodiment of the present invention. The system 200 shown in FIG. 2 may include the same configuration as system 100 shown in FIG. 1 except the output manager 140 may forward the generated augmented pair (V, A) to the initial training database 150. In this embodiment, the LVG 110 may receive the augmented pair (V, A) from the initial training database and may generate another alternative to variation V. This variation may then be stored in an augmented training database 160 shown in FIG. 1. In embodiments of the present invention, an applications developer can choose the number of times an original entry and/or augmented entry should be processed by the LVG 110 to generate another variation.

It is recognized that any suitable hardware and/or software may be used by one of ordinary skill in the art to configure and/or implement the systems shown in FIGS. 1 and 2 including the LVG 110, the initial training database 150, the augmented training database 160, and output manager 140 in accordance with embodiments of the present invention.

FIG. 3 is a flowchart illustrating a method for augmenting a training database of an automated language-understanding system in accordance with an exemplary embodiment of the present invention. As shown in step 3010, a training example in a first language is received from a training database 150. The first language-training example is translated to an output in a second language, as shown in step 3020. It is recognized that the first and second languages may be any known languages. The second language output is translated to a first variant of the first language-training example, as shown in step 3030. As shown in step 3040, the first variant of the first language training example and an action command associated with the first language training example may be stored as action pair in the augmented training database.

It is recognized that the training database, for example, the augmented training database 160 generated in accordance with embodiments of the present invention may be used in variety of language understanding systems. A variety of rules and/or techniques known in the art may be applied to the contents of the augmented training database 160 to be used in systems that utilize an automated understanding system.

The method of FIGS. 1 and 2 of the present invention may be implemented using a programmed processor. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIG. 3 can be used to implement the input recognition and/or automated language-understanding system functions of this invention.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for augmenting an initial training database, comprising:
  receiving a training example from the initial training database, wherein the training example is from an action pair comprising the training example and an action command associated with the training example;
  translating the training example to an output, wherein the output comprises a variation of the training sample;
  translating the output to a first variant of the training example; and
  storing an augmented action pair including the first variant of the training example and the action command associated with the training example in an augmented training database.

2. The method of claim 1, further comprising:
  translating the output to a second output;
  translating the second output to a second variant of the training example; and
  outputting the second variant of the training example to an output manager.

3. The method of claim 2, further comprising:
  storing an augmented action pair including the second variant of the training example and the action command associated with the training example in the augmented training database.

4. The method of claim 1, wherein the action command is a computer executable command.

5. The method of claim 1, wherein the training example comprises a first phrase.

6. The method of claim 5, wherein the output comprises a different phrase from the first phrase.

7. The method of claim 1, wherein the first variant is in a natural language.

8. A system for augmenting an initial training database, comprising:
  a first translation unit configured to translate a training example to an output, wherein the training example is from an action pair comprising the training example and an action command associated with the training example;
  a second translation unit configured to translate the output to a first variant of the training example, wherein the output comprises a variation of the training sample; and
  a database configured to store an augmented action pair including the first variant of the training example and the action command associated with the training example.

9. The system of claim 8, further comprising:
  a translation unit configured to translate the output to a second output; and
  a translation unit configured to translate the second output to a second variant of the training example.

10. The system of claim 9, further comprising:
  an output manager configured to output the second variant of the training example.

11. The system of claim 9, wherein the database is configured to store the second variant of the training example and the action command associated with the training example.

12. A machine-readable medium having stored thereon a plurality of executable instructions, the plurality of instructions comprising instructions to:
  receive a training example from an initial training database, wherein the training example is from an action pair comprising the training example and an action command associated with the training example;
  translate the training example to an output, wherein the output comprises a variation of the training sample;
  translate the output to a first variant of the training example; and
  store an augmented action pair including the first variant of the training example and the action command associated with the training example in an augmented training database.

13. The machine-readable medium of claim 12 having stored thereon additional executable instructions, the additional instructions comprising instructions to:
  translate the output to a second output;
  translate the second output to a second variant of the training example; and
  output the second variant of the training example to an output manager.

14. The machine-readable medium of claim 13 having stored thereon additional executable instructions, the additional instructions comprising instructions to:
  store an augmented action pair including the second variant of the training example and the action command associated with the training example in the augmented training database.

15. A system for augmenting an initial training database, comprising:
  a translation unit configured to translate a training example to an output and configured to translate the output to a first variant of the training example, wherein the training example is from an action pair comprising the training example and an action command associated with the training example, wherein the output comprises a variation of the training sample; and
  a database for storing an augmented action pair including the first variant of the training example and the action command associated with the training example.

16. The system of claim 15, wherein the translation unit translates the output to a second output and translates the second output to a second variant of the training example.

17. The system of claim 16, further comprising:
  an output manager for outputting the second variant of the training example.

18. The system of claim 16, wherein the database is for storing the second variant of the training example and the action command associated with the training example.

* * * * *